United States Patent
Iida et al.

(10) Patent No.: US 10,040,016 B1
(45) Date of Patent: Aug. 7, 2018

(54) PLUGGED HONEYCOMB STRUCTURE

(71) Applicant: NGK INSULATORS, LTD., Nagoya (JP)

(72) Inventors: Tomohiro Iida, Nagoya (JP); Kazuto Miura, Nagoya (JP); Takashi Aoki, Nagoya (JP); Osamu Yasui, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/875,251

(22) Filed: Jan. 19, 2018

(30) Foreign Application Priority Data

Feb. 2, 2017 (JP) ................. 2017-017465

(51) Int. Cl.
| | |
|---|---|
| *B01J 27/224* | (2006.01) |
| *B01J 35/04* | (2006.01) |
| *B01J 35/10* | (2006.01) |
| *B01D 46/24* | (2006.01) |
| *C04B 38/00* | (2006.01) |
| *B01D 53/94* | (2006.01) |

(52) U.S. Cl.
CPC ....... *B01D 46/2429* (2013.01); *B01D 46/247* (2013.01); *B01D 46/2474* (2013.01); *B01D 53/94* (2013.01); *B01J 27/224* (2013.01); *B01J 35/04* (2013.01); *B01J 35/1038* (2013.01); *B01J 35/1076* (2013.01); *C04B 38/0009* (2013.01); *B01D 2046/2433* (2013.01); *B01D 2046/2437* (2013.01); *B01D 2046/2481* (2013.01); *B01D 2255/915* (2013.01); *B01D 2279/30* (2013.01)

(58) Field of Classification Search
CPC ..... B01J 27/224; B01L 35/04; B01L 35/1038; B01L 35/1076; B01D 46/2429; B01D 46/247; B01D 46/2474; C04B 38/0009
See application file for complete search history.

(56) References Cited

U.S. PATENT DOCUMENTS

| | | | | |
|---|---|---|---|---|
| 6,827,754 | B2* | 12/2004 | Suwabe | B01D 46/2459 55/282.3 |
| 7,011,803 | B2* | 3/2006 | Ichikawa | B01D 46/2429 423/345 |
| 7,244,685 | B2* | 7/2007 | Furukawa | B01J 27/224 501/88 |

(Continued)

FOREIGN PATENT DOCUMENTS

| | | |
|---|---|---|
| JP | 2002-219319 A1 | 8/2002 |
| WO | 2006/030811 A1 | 3/2006 |

*Primary Examiner* — Cam N. Nguyen
(74) *Attorney, Agent, or Firm* — Burr & Brown, PLLC

(57) ABSTRACT

A plugged honeycomb structure including: a pillar-shaped honeycomb structure body having porous partition walls made of a material including silicon carbide, and plugging portions, wherein a porosity of the partition walls is from 42 to 52%, a thickness of the partition walls is from 0.15 to 0.36 mm, a ratio of a volume of pores having pore diameters of 10 μm or less to a total pore volume of the partition walls is 41% or less, a ratio of a volume of pores having pore diameters in a range of 18 to 36 μm to the total pore volume is 10% or less, the pore diameter indicating a maximum value of the log differential pore volume is in a range of 10 to 16 μm, and a half-value width of a peak including the maximum value of the log differential pore volume is 5 μm or less.

12 Claims, 2 Drawing Sheets

(56) References Cited

U.S. PATENT DOCUMENTS

| | | | | |
|---|---|---|---|---|
| 7,413,717 B2* | 8/2008 | Hirai | B01D 53/885 | 422/168 |
| 7,449,427 B2* | 11/2008 | Ohno | B01D 46/2429 | 156/89.22 |
| 7,452,591 B2* | 11/2008 | Tabuchi | B01D 39/2075 | 423/345 |
| 7,488,412 B2* | 2/2009 | Abe | B01D 46/0024 | 208/180 |
| 7,504,359 B2* | 3/2009 | Ogyu | B01D 46/2429 | 423/345 |
| 7,731,774 B2* | 6/2010 | Ohno | B01D 46/2429 | 502/439 |
| 7,754,160 B2* | 7/2010 | Miyairi | B01J 23/63 | 422/180 |
| 7,842,372 B2* | 11/2010 | Tsuneyoshi | B01D 46/2429 | 428/116 |
| 7,867,598 B2* | 1/2011 | Miyairi | B01D 39/2051 | 428/116 |
| 8,133,841 B2* | 3/2012 | Noda | B01D 46/2429 | 422/177 |
| 8,192,517 B2* | 6/2012 | Kunieda | B01J 35/04 | 55/523 |
| 8,277,737 B2* | 10/2012 | DiFrancesco | B01J 35/04 | 422/180 |
| 8,444,739 B2* | 5/2013 | Mizuno | B01D 46/2425 | 422/169 |
| 8,609,581 B2* | 12/2013 | Miyairi | B01D 46/2451 | 422/171 |
| 8,663,356 B2* | 3/2014 | Goto | B01D 46/2429 | 422/169 |
| 8,722,172 B2* | 5/2014 | Sendo | C04B 35/195 | 428/116 |
| 8,734,558 B2* | 5/2014 | Miyairi | B01D 46/2429 | 422/169 |
| 8,778,825 B2* | 7/2014 | Hirose | B01D 46/2429 | 502/80 |
| 9,061,942 B2* | 6/2015 | Miyairi | B01D 46/2429 | |
| 9,091,197 B2* | 7/2015 | Hirose | B01D 46/2425 | |
| 9,101,865 B2* | 8/2015 | Izumi | C04B 38/0009 | |
| 9,163,538 B2* | 10/2015 | Miyairi | F01N 3/0222 | |
| 9,168,478 B2* | 10/2015 | Miyairi | C04B 35/565 | |
| 9,217,344 B2* | 12/2015 | Mizuno | B01D 46/2425 | |
| 9,346,714 B2* | 5/2016 | Izumi | B01D 39/20 | |
| 9,457,345 B2* | 10/2016 | Tomita | B01J 27/224 | |
| 2003/0041574 A1 | 3/2003 | Noguchi et al. | | |
| 2008/0092499 A1 | 4/2008 | Otsuka et al. | | |

\* cited by examiner

PLUGGED HONEYCOMB STRUCTURE

The present application is an application based on JP 2017-017465 filed on Feb. 2, 2017 with Japan Patent Office, the entire contents of which are incorporated herein by reference.

BACKGROUND OF THE INVENTION

Field of the Invention

The present invention relates to a plugged honeycomb structure, and more particularly, it relates to a plugged honeycomb structure which has an excellent trapping performance and is capable of effectively decreasing an increase ratio of pressure loss due to loading of an exhaust gas purifying catalyst and trapping of particulate matter.

Description of the Related Art

Heretofore, plugged honeycomb structures in which honeycomb structures are used have been known as a filter to trap particulate matter in an exhaust gas emitted from an internal combustion engine such as a diesel engine, and a device to purify toxic gas components of CO, HC, $NO_x$ and the like (see Patent Documents 1 and 2). Such a honeycomb structure has partition walls made of porous ceramics such as cordierite and silicon carbide, and a plurality of cells are defined by these partition walls. The plugged honeycomb structure is constituted by arranging plugging portions to alternately plug open ends of the plurality of cells on the side of an inflow end face and open ends of the cells on the side of an outflow end face in the above-mentioned honeycomb structure. In other words, the plugged honeycomb structure has a structure where inflow cells opened on the inflow end face side and plugged on the outflow end face side and outflow cells plugged on the inflow end face side and opened on the outflow end face side are alternately arranged via the partition walls. Furthermore, in the plugged honeycomb structure, the porous partition walls perform a function of a filter to trap the particulate matter in the exhaust gas. Hereinafter, the particulate matter included in the exhaust gas will occasionally be referred to as "PM". "The PM" is an abbreviation for "the particulate matter".

The exhaust gas is purified by the plugged honeycomb structure as follows. Initially, the plugged honeycomb structure is disposed so that its inflow end face side faces an upstream side with an exhaust system from which the exhaust gas is to be emitted. The exhaust gas flows from the inflow end face side of the plugged honeycomb structure into the inflow cells. Then, the exhaust gas flowing into the inflow cells passes through the porous partition walls to flow to the outflow cells, and is emitted from the outflow end face of the plugged honeycomb structure. When the exhaust gas passes through the porous partition walls, the PM and the like in the exhaust gas are trapped and removed. Furthermore, in the purification of the exhaust gas by the plugged honeycomb structure, an exhaust gas purifying catalyst is loaded in pores formed in the partition walls, to purify the toxic gas components. According to such a constitution, when the exhaust gas passes through the partition walls, the toxic gas components can be purified by the catalyst loaded in the pores of the partition walls.

For example, a porous honeycomb filter described in Patent Document 1 is made of a material including cordierite having a controlled pore distribution as a main crystal phase. In Patent Document 1, there is disclosed a technology of controlling the pore distribution so that a volume ratio of pores having pore diameters smaller than 10 µm is 15% or less of a total pore volume, a volume ratio of pores having pore diameters in a range of 10 to 50 µm is 75% or more of the total pore volume, and a volume ratio of pores having pore diameters in excess of 50 µm is 10% or less of the total pore volume.

Furthermore, in a porous honeycomb filter described in Patent Document 2, pore volumes of small pores having pore diameters of 15 µm or less and large pores having pore diameters of 40 µm or more are prescribed so that a trapping efficiency does not deteriorate even when a porosity varies and so that an excellent trapping performance is compatible with low pressure loss. The ratio of the pore volume per unit volume of this porous honeycomb filter is prescribed in the unit of "cc/cc". In this case, even when the total pore volume varies, the prescribed pore volume does not vary.

[Patent Document 1] JP-A-2002-219319
[Patent Document 2] WO 2006/030811

SUMMARY OF THE INVENTION

In purification of an exhaust gas by a plugged honeycomb structure, when the exhaust gas passes through pores formed in partition walls, PM in the exhaust gas is trapped in these pores. Therefore, it is considered that improvement of a trapping performance of the plugged honeycomb structure is achievable by decreasing large pores and increasing small pores in a pore distribution of the pores formed in the partition walls.

However, in the case of using the plugged honeycomb structure in a filter as described above, an exhaust gas purifying catalyst is loaded onto the partition walls to provide a purifying performance by a chemical reaction of the catalyst. Consequently, in a conventional plugged honeycomb structure, there has been the problem that the catalyst loaded onto the partition walls often enters and closes the pores having comparatively smaller pore diameters among the pores formed in the partition walls. Furthermore, when the PM is trapped, the PM is gradually deposited in the pores. Therefore, with the trapping of the PM, the closing of the pores further proceeds, and an airflow resistance in the pores gradually increases. Consequently, in the conventional plugged honeycomb structure, there has been a problem that a pressure difference between an inflow end face side and an outflow end face side (pressure loss) increases, thereby causing fears of engine output drop and influence on fuel consumption.

For example, in a porous honeycomb filter described in Patent Document 1, ratios of pore volumes to a total pore volume are prescribed. Therefore, when the total pore volume varies, the volume of pores having a specific diameter also varies. When the total pore volume varies, it is meant that a porosity changes. For example, when the porosity increases, a volume of large pores increases, and there is the fear that the trapping performance is influenced.

Furthermore, in a porous honeycomb filter described in Patent Document 2, pore volumes of small pores having pore diameters of 15 µm or less and large pores having pore diameters of 40 µm or more are only prescribed, and any pore volumes are not prescribed in a region of pore diameters outside the above ranges. In consequence, there has been a problem that when variations of the pore diameters increase, an increase ratio of pressure loss at the time of trapping PM after a catalyst is loaded noticeably rises.

The present invention has been developed in view of such problems of a conventional technology. According to the present invention, there is provided a plugged honeycomb structure which has an excellent trapping performance and is capable of effectively inhibiting increase of pressure loss due to loading of an exhaust gas purifying catalyst and trapping of particulate matter. That is, there is provided a plugged honeycomb structure which is capable of suppressing to a lower level an increase ratio of pressure loss due to loading of an exhaust gas purifying catalyst and trapping of particulate matter, on the basis of the pressure loss of the plugged honeycomb structure prior to loading the exhaust gas purifying catalyst. Hereinafter, the above "increase ratio of the pressure loss due to loading of an exhaust gas purifying catalyst and trapping of particulate matter" will occasionally be referred to as "the pressure loss increase ratio".

As a result of intensive studies to achieve a plugged honeycomb structure which has an excellent trapping performance and is capable of decreasing a pressure loss increase ratio, the present inventors have obtained the following findings. Initially, for the purpose of suppressing to a low level the pressure loss increase ratio after a catalyst is loaded and PM is trapped, it is effective to decrease a pore volume of pores having comparatively small pore diameters among pores formed in partition walls. Hereinafter, "the pores having small pore diameters" will occasionally be referred to as "the small pores". Furthermore, for improvement of the trapping performance, it is effective to decrease a pore volume of pores having comparatively large pore diameters among the pores formed in the partition walls. Hereinafter, "the pores having large pore diameters" will occasionally be referred to as "the large pores". On the other hand, the pressure loss of the plugged honeycomb structure is also influenced by a porosity of the partition walls. Consequently, when the small pores and large pores are decreased as described above, it is also important to increase a pore volume of pores having medium pore diameters except the small pores and the large pores. Hereinafter, "the pores having medium pore diameters except the small pores and the large pores" will occasionally be referred to as "the medium pores". Here, as to the medium pores whose pore volume increases, it is useful to decrease variations of a distribution including a maximum value of the pore volume in a medium pore diameter distribution, for the purpose of suppressing the pressure loss increase ratio to a low level. In other words, it is useful to sharpen a peak including the maximum value of the pore volume of the medium pores, for the purpose of suppressing the pressure loss increase ratio to a low level. In consequence, it has been found that when a pore diameter distribution of the partition walls is obtained so that all the above-mentioned conditions are established, the plugged honeycomb structure which has the excellent trapping performance and is capable of decreasing the pressure loss increase ratio is achievable.

According to the present invention, there is provided a plugged honeycomb structure as follows.

[1] A plugged honeycomb structure including:
a pillar-shaped honeycomb structure body having porous partition walls arranged to surround a plurality of cells extending from a first end face to a second end face and forming through channels for a fluid; and
plugging portions each of which is disposed in an open end of each of the cells on the side of the first end face or the second end face,
wherein the partition walls are made of a material including silicon carbide,
a porosity of the partition walls which is measured by mercury porosimetry is from 42 to 52%,
a thickness of the partition walls is from 0.15 to 0.36 mm, and
in an accumulated pore volume of the partition walls which is measured by the mercury porosimetry,
a ratio of a volume of pores having pore diameters of 10 μm or less to a total pore volume of the partition walls is 41% or less, and a ratio of a volume of pores having pore diameters in a range of 18 to 36 μm to the total pore volume is 10% or less, and
in a pore diameter distribution of the partition walls in which the abscissa indicates the pore diameter and the ordinate indicates a log differential pore volume, the pore diameter indicating a maximum value of the log differential pore volume is in a range of 10 to 16 μm, and a half-value width of a peak including the maximum value of the log differential pore volume is 5 μm or less.

[2] The plugged honeycomb structure according to the above [1], wherein a ratio of a volume of pores having pore diameters of 18 μm or more to the total pore volume of the partition walls is 20% or less.

[3] The plugged honeycomb structure according to the above [1] or [2], wherein a ratio of a volume of pores having pore diameters of 40 μm or less to the total pore volume of the partition walls is 91% or more.

[4] The plugged honeycomb structure according to any one of the above [1] to [3], wherein the material constituting the partition walls includes 40 mass % or more of silicon carbide.

[5] The plugged honeycomb structure according to any one of the above [1] to [4], wherein the volume of the pores having pore diameters of 10 μm or less in the partition walls is 0.1 $cm^3/g$ or less.

[6] The plugged honeycomb structure according to any one of the above [1] to [5], wherein a volume of pores having pore diameters of 18 μm or more in the partition walls is 0.065 $cm^3/g$ or less.

[7] The plugged honeycomb structure according to any one of the above [1] to [6], wherein the volume of the pores having the pore diameters in the range of 18 to 36 μm in the partition walls is 0.035 $cm^3/g$ or less.

The present invention produces the effect that a plugged honeycomb structure has an excellent trapping performance and is capable of decreasing a pressure loss increase ratio. Specifically, in the plugged honeycomb structure of the present invention, a ratio of a volume of pores having pore diameters of 10 μm or less to a total pore volume of the partition walls is 41% or less, and a ratio of a volume of pores having pore diameters in a range of 18 to 36 μm to the total pore volume is 10% or less. Furthermore, in a pore diameter distribution of the partition walls in which the abscissa indicates the pore diameter and the ordinate indicates a log differential pore volume, the pore diameter indicating a maximum value of the log differential pore volume is in a range of 10 to 16 μm, and a half-value width of a peak including the maximum value of the log differential pore volume is 5 μm or less. According to such a constitution, when an exhaust gas purifying catalyst is loaded onto the partition walls, the pores formed in the partition walls are hard to be closed with the loaded catalyst, and also when PM is trapped in the pores, the pores formed in the partition walls are hard to be closed. In consequence, such a pore diameter distribution as described above makes it possible to realize an effective trapping performance as a filter to trap the PM in an exhaust gas emitted from an internal combustion engine.

DESCRIPTION OF THE PREFERRED EMBODIMENTS

Hereinafter, description will be made as to an embodiment of the present invention. However, the present invention is not limited to the following embodiment. Therefore, it should be understood that the following embodiment to which modifications, improvements and the like are suitably added on the basis of ordinary knowledge of a person skilled in the art without departing from the gist of the present invention also falls in the scope of the present invention.

Figure 1:
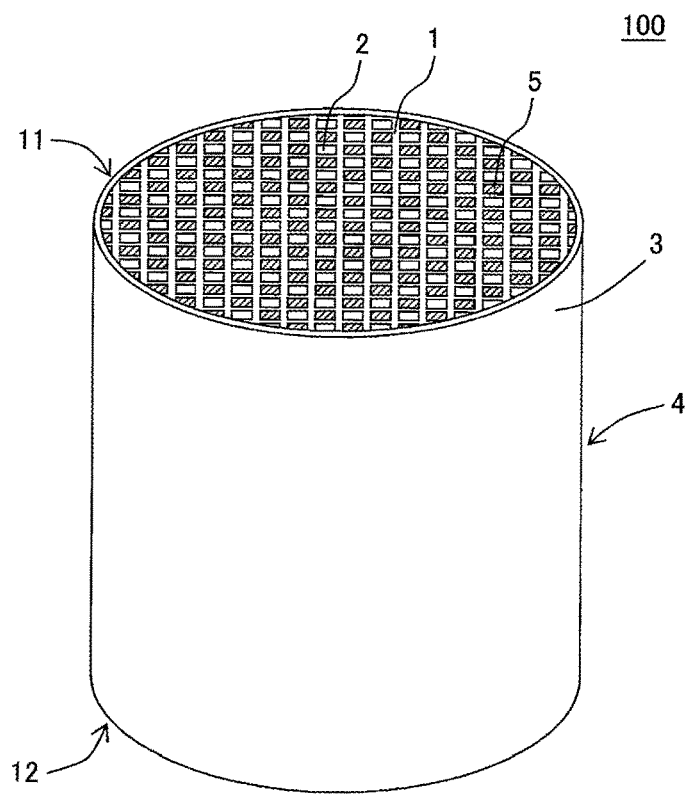
FIG. 1 is a perspective view schematically showing one embodiment of a plugged honeycomb structure of the present invention and seen from an inflow end face side.
Figure 2:
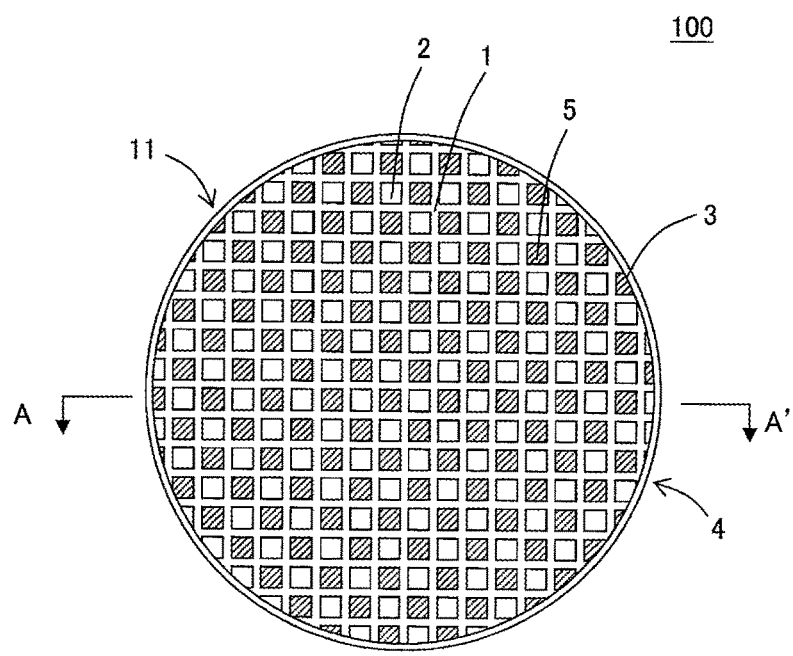
FIG. 2 is a plan view seen from the inflow end face side of the plugged honeycomb structure shown in FIG. 1.
Figure 3:
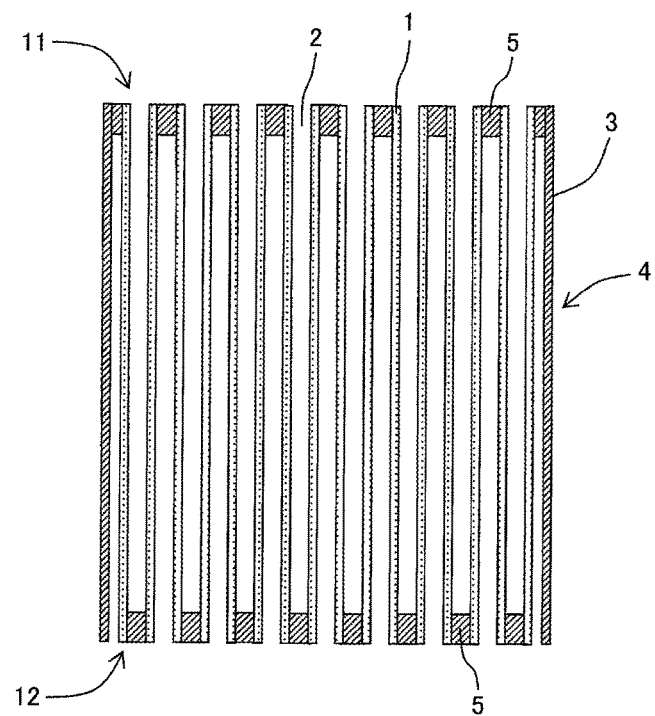
FIG. 3 is a cross-sectional view schematically showing a cross section taken along the A-A' line of FIG. 2.

(1) Plugged Honeycomb Structure:

As shown in FIG. 1 to FIG. 3, a first embodiment of a plugged honeycomb structure of the present invention is a plugged honeycomb structure 100 including a honeycomb structure body 4 and plugging portions 5. The honeycomb structure body 4 is a pillar-shaped body having porous partition walls 1 arranged to surround a plurality of cells 2 extending from a first end face 11 to a second end face 12 and forming through channels for a fluid. In the plugged honeycomb structure 100 of the present embodiment, the honeycomb structure body 4 possesses the pillar shape, and further has a circumferential wall 3 in its circumferential surface. In other words, the circumferential wall 3 is disposed to surround the partition walls 1 arranged in a lattice manner. Each of the plugging portions 5 is disposed in an open end of each of the plurality of cells 2 on the side of the first end face 11 or the second end face 12.

Here, FIG. 1 is a perspective view schematically showing one embodiment of the plugged honeycomb structure of the present invention and seen from the inflow end face side. FIG. 2 is a plan view seen from the inflow end face side of the plugged honeycomb structure shown in FIG. 1. FIG. 3 is a cross-sectional view schematically showing a cross section taken along the A-A' line of FIG. 2.

In the plugged honeycomb structure 100 of the present embodiment, the partition walls 1 constituting the honeycomb structure body 4 are constituted as follows. Initially, the partition walls 1 are made of a material including silicon carbide. The material constituting the partition walls 1 is a material including preferably 40 mass % or more, further preferably 50 mass % or more and especially preferably 60 mass % or more of silicon carbide in the whole material.

Examples of the material constituting the partition walls 1 include silicon carbide, a silicon-silicon carbide composite material, and a cordierite-silicon carbide composite material. The silicon-silicon carbide composite material is a composite material formed by using silicon carbide as aggregates and using silicon as a bonding material. Furthermore, the cordierite-silicon carbide composite material is a composite material formed by using silicon carbide as aggregates and using cordierite as a bonding material. It is to be noted that the material constituting the partition walls 1 may include any component other than the above-mentioned silicon or cordierite, as long as the material substantially includes silicon carbide.

In the plugged honeycomb structure 100 of the present embodiment, a porosity of the partition walls 1 is from 42 to 52%. The porosity of the partition walls 1 is a value measured by mercury porosimetry. The porosity of the partition walls 1 is measurable by using AutoPore 9500 (tradename) manufactured by Micromeritics Instrument Corp. For the measurement of the porosity, a part of the partition walls 1 is cut out as a test piece from the plugged honeycomb structure 100, and the measurement can be performed by using the obtained test piece. The porosity of the partition walls 1 is preferably from 44 to 52% and further preferably from 46 to 52%.

When the porosity of the partition walls 1 is smaller than 42%, it is difficult to decrease a pressure loss increase ratio of the plugged honeycomb structure 100. That is, the increase ratio of pressure loss increased due to loading of an exhaust gas purifying catalyst and trapping of particulate matter. On the other hand, when the porosity of the partition walls 1 is in excess of 52%, a trapping performance of the plugged honeycomb structure 100 as a filter deteriorates.

A thickness of the partition walls 1 is from 0.15 to 0.36 mm. The thickness of the partition walls 1 is measurable by using a scanning electron microscope or a microscope. The thickness of the partition walls 1 is preferably from 0.17 to 0.33 mm and further preferably from 0.20 to 0.32 mm. When the thickness of the partition walls 1 is smaller than 0.15 mm, the trapping performance unfavorably deteriorates. On the other hand, when the thickness of the partition walls 1 is in excess of 0.36 mm, the pressure loss increases when the catalyst is loaded onto the partition walls 1, due to loading of an exhaust gas purifying catalyst and trapping of particulate matter, and thereby the increase ratio of the pressure loss might increase. For example, when the catalyst is loaded onto the partition walls 1, an operation of sucking a slurry including the catalyst and introducing the catalyst into the pores of the partition walls 1 is performed, but if the thickness of the partition walls 1 is large, a suction force is not easily obtainable. Therefore, the catalyst is densely distributed in the vicinity of the surface of each partition wall 1, and the increase ratio of the pressure loss might increase.

Furthermore, the plugged honeycomb structure 100 of the present embodiment has, as a main constitution, such pore diameter distributions as described below in (1) to (4) in an accumulated pore volume of the partition walls 1 which is measured by the mercury porosimetry.

(1) A ratio of a volume of pores having pore diameters of 10 µm or less to a total pore volume of the partition walls 1 is 41% or less.

(2) A ratio of a volume of pores having pore diameters in a range of 18 to 36 µm to the total pore volume of the partition walls 1 is 10% or less.

(3) In a pore diameter distribution of the partition walls 1 in which the abscissa indicates the pore diameter and the ordinate indicates a log differential pore volume, the pore diameter indicating a maximum value of the log differential pore volume is in a range of 10 to 16 µm.

(4) A half-value width of a peak including the maximum value of the log differential pore volume is 5 µm or less.

Here, the accumulated pore volume of the partition walls 1 is a value measured by the mercury porosimetry. The measurement of the accumulated pore volume of the partition walls 1 can be performed by using, for example, AutoPore 9500 (tradename) manufactured by Micromeritics Instrument Corp. The measurement of the accumulated pore volume of the partition walls 1 can be performed by the following method. Initially, a part of the partition walls 1 is cut out from the plugged honeycomb structure 100, to prepare a test piece for the measurement of the accumulated pore volume. There are not any special restrictions on a size of the test piece, but it is preferable that the test piece is, for example, a rectangular parallelepiped having a vertical length of about 10 mm, a horizontal length of about 10 mm, and a height of about 20 mm. There are not any special restrictions on a region of the partition walls 1 from which the test piece is to be cut out, but it is preferable to cut and prepare the test piece from the vicinity of a center of the honeycomb structure body in an axial direction. The obtained test piece is stored in a measuring cell of a measuring device, and the inside of the measuring cell is decompressed. Next, mercury is introduced into the measuring cell. Then, the mercury introduced in the measuring cell is pressurized, and during the pressurizing, a volume of the mercury pushed into pores which are present in the test piece is measured. In this case, as the pressure to be applied to the mercury increases, the mercury is pushed successively from pores having large pore diameters into pores having small pore diameters. Therefore, a relation between "the pore diameters of the pores formed in the test piece" and "the accumulated pore volume" is obtainable from a relation between "the pressure to be applied to the mercury" and "a volume of the mercury pushed into the pores". "The accumulated pore volume" is a value obtained, for example, by accumulating volumes of pores having pore diameters in a range of from a maximum pore diameter to a specific pore diameter.

Figure 4:
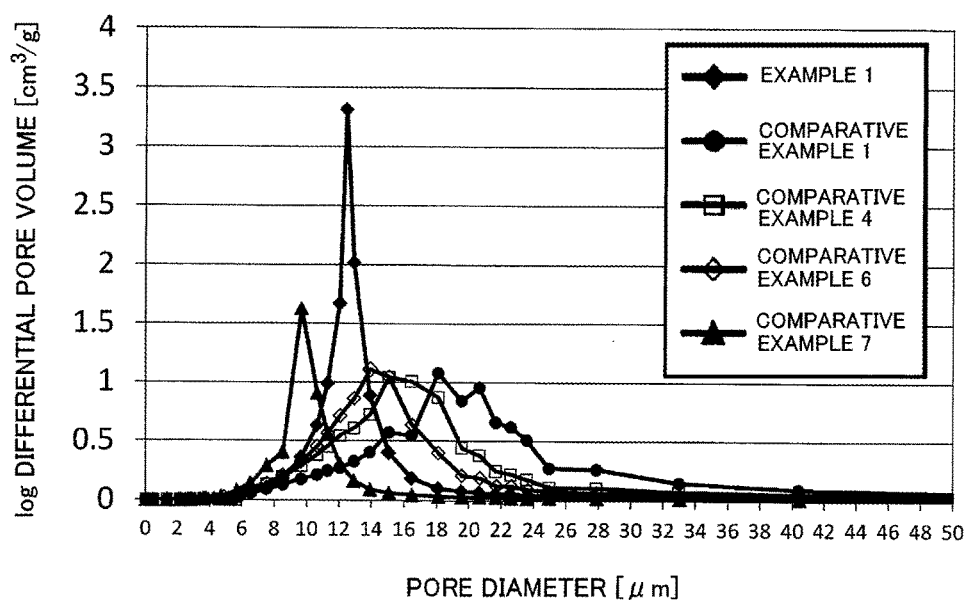
FIG. 4 is a graph showing pore diameter distributions of plugged honeycomb structures of Example 1 and Comparative Examples 1, 4, 6 and 7.

Above "the pore diameter distribution of the partition walls 1 in which the abscissa indicates the pore diameter and the ordinate indicates the log differential pore volume" means, for example, a graph in which the abscissa indicates a pore diameter (unit: μm) of a common logarithm and the ordinate indicates a log differential pore volume (unit: $cm^3/g$). An example of this graph is such a graph as shown in FIG. 4. FIG. 4 is the graph showing pore volumes of partition walls in plugged honeycomb structures prepared in examples described later. More specifically, FIG. 4 is a graph showing pore diameter distributions of the plugged honeycomb structures of Example 1 and Comparative Examples 1, 4, 6 and 7.

Here, description is made as to the graph concerning the log differential pore volume shown in FIG. 4. The graph shown in FIG. 4 shows a relation between "the log differential pore volume" and "the pore diameter". The pore diameter is occasionally referred to as a pore width across. When pressure is gradually applied by the mercury porosimetry so that mercury intrudes into pores of a sample which is present in a container sealed in a vacuum state, the mercury successively intrudes from the large pores into the small pores. It is possible to calculate the pore diameter (i.e., the pore width across) and pore volume of the pores formed in the sample from the pressure at this time and an amount of the pressed mercury. The pore diameters are defined below as D1, D2, D3 . . . , in which a relation of D1>D2>D3 . . . is satisfied. Here, the abscissa can show an average pore diameter D between measurement points (e.g., between D1 and D2) as "the average pore diameter D=(D1+D2)/2". Furthermore, the log differential pore volume of the ordinate can be a value obtained by dividing an increase dV of the pore volume between the respective measurement points by a difference value between logarithms of the pore diameters (i.e., "log(D1)−log(D2)"). In the graph showing the relation between the log differential pore volume and the pore diameter, a point at which the log differential pore volume is maximized is defined as "the peak". Additionally, the half-value width is a width of the pore diameter having a height which is a half of a height of the peak (i.e., the log differential pore volume).

The plugged honeycomb structure including the partition walls having the pore diameter distribution which satisfies all of the above (1) to (4) has an excellent trapping performance and is capable of decreasing the pressure loss increase ratio.

In the above (1), when the ratio of the volume of the pores having the pore diameters of 10 μm or less is in excess of 41%, the ratio of the pores having comparatively small pore diameters increases, and it is difficult to decrease the pressure loss increase ratio. In the above (2), when the ratio of the volume of the pores having the pore diameters in the range of 18 to 36 μm is in excess of 10%, the ratio of the pores having comparatively large pore diameters increases, and the trapping performance deteriorates. In the above (3), when the pore diameter indicating the maximum value of the log differential pore volume is present outside the range of 10 to 16 μm, improvement of the trapping performance is not easily compatible with the decrease of the pressure loss increase ratio. In the above (4), when the half-value width of the peak including the maximum value is in excess of 5 μm, the peak including the maximum value has an excessively large width, and it is difficult to decrease the pressure loss increase ratio.

In the above (1), there are not any special restrictions on a lower limit value of the ratio of the volume of the pores having the pore diameters of 10 μm or less to the total pore volume of the partition walls 1, and it is preferable that the value is further smaller. The lower limit value is substantially 8%. Therefore, the ratio of the volume of the pores having the pore diameters of 10 μm or less is preferably from 8 to 41% and further preferably from 10 to 30%.

In the above (2), there are not any special restrictions on a lower limit value of the ratio of the volume of the pores having the pore diameters in the range of 18 to 36 μm to the total pore volume of the partition walls 1, and it is preferable that the value is further smaller. The lower limit value is substantially 3%. Therefore, the ratio of the volume of the pores having the pore diameters in the range of 18 to 36 μm is preferably from 3 to 10% and further preferably from 6 to 10%.

The pore diameter indicating the maximum value of the log differential pore volume is present preferably in a range of 10 to 16 μm and further preferably in a range of 10 to 15 μm.

There are not any special restrictions on the lower limit value of the half-value width of the peak including the maximum value, and it is preferable that the value is further smaller. The lower limit value is substantially 1 μm. Therefore, the half-value width of the peak including the maximum value is preferably from 1 to 5 μm and further preferably from 1 to 4 μm. "The half-value width of the peak including the maximum value" is "a width of the peak including the maximum value" at the height of the half of the maximum value of the pore diameter.

A ratio of a volume of pores having pore diameters of 18 μm or more to the total pore volume of the partition walls 1 is preferably 20% or less, further preferably from 5 to 20%, and especially preferably from 10 to 20%. When the ratio of the volume of the pores having the pore diameters of 18 μm or more is in excess of 20%, the trapping performance might deteriorate.

A ratio of a volume of pores having pore diameters of 40 μm or less to the total pore volume of the partition walls 1 is preferably 91% or more, further preferably from 91 to 100%, and especially preferably from 91 to 95%. When the ratio of the volume of the pores having the pore diameters of 40 μm or less is smaller than 91%, the trapping performance might deteriorate.

The volume of the pores having the pore diameters of 10 μm or less in the partition walls 1 is preferably 0.1 cm$^3$/g or less, further preferably from 0.02 to 0.1 cm$^3$/g, and especially preferably from 0.03 to 0.08 cm$^3$/g. According to this constitution, the pores having comparatively small pore diameters decrease, and it is possible to decrease the pressure loss increase ratio.

The volume of the pores having the pore diameters of 18 μm or more in the partition walls 1 is preferably 0.065 cm$^3$/g or less, further preferably from 0.01 to 0.06 cm$^3$/g, and especially preferably from 0.02 to 0.06 cm$^3$/g. According to this constitution, the pores having comparatively large pore diameters decrease, and it is possible to inhibit the deterioration of the trapping performance.

The volume of the pores having the pore diameters in the range of 18 to 36 μm in the partition walls 1 is preferably 0.035 cm$^3$/g or less, further preferably from 0.01 to 0.03 cm$^3$/g and especially preferably from 0.02 to 0.03 cm$^3$/g. According to this constitution, it is possible to inhibit the deterioration of the trapping performance.

An average pore diameter of the partition walls 1 is preferably from 8 to 18 μm and further preferably from 9 to 17 μm. Here, the average pore diameter of the partition walls 1 is a pore diameter to provide a volume of a half of the total pore volume of the pores in which the mercury is absorbed by the mercury porosimetry.

There are not any special restrictions on a shape of the cells 2 formed in the honeycomb structure body 4. Examples of the shape of the cells 2 in a cross section perpendicular to an extending direction of the cells 2 include a polygonal shape, a round shape, and an elliptic shape. It is preferable that examples of the polygonal shape include a triangular shape, a quadrangular shape, a pentagonal shape, a hexagonal shape and an octagonal shape. Additionally, it is preferable that the shape of the cells 2 is triangular, quadrangular, pentagonal, hexagonal, or octagonal. Furthermore, as to the shape of the cells 2, all the cells 2 may have the same shape or the cells may have different shapes. For example, although not shown in the drawing, the cell shape may be a combination of quadrangular cells and octagonal cells. Additionally, as to a size of the cells 2, all the cells 2 may have the same size or the cells may have different sizes. For example, although not shown in the drawing, a cell size of parts of the plurality of cells may be large, and the other cells may have a relatively small size. It is to be noted that in the present invention, the cell means a space surrounded with the partition walls.

A cell density of the cells 2 defined by the partition walls 1 is preferably from 23 to 62 cells/cm$^2$ and further preferably from 39 to 56 cells/cm$^2$. According to this constitution, the plugged honeycomb structure 100 of the present embodiment is suitably utilizable as the filter to purify an exhaust gas emitted from an engine of a car.

The circumferential wall 3 of the honeycomb structure body 4 may be constituted monolithically with the partition walls 1, and although not shown in the drawing, the circumferential wall may be a circumference coating layer formed by coating a circumference coating material on a circumferential side of the partition walls. For example, during manufacturing, the partition walls are formed monolithically with the circumferential wall, the formed circumferential wall is removed by a known method of grinding or the like, and then the circumference coating layer can be disposed on the circumference side of the partition walls.

There are not any special restrictions on a shape of the honeycomb structure body 4. An example of the shape of the honeycomb structure body 4 is a pillar shape in which the first end face 11 (e.g., an inflow end face) and the second end face 12 (e.g., an outflow end face) are round, elliptic or polygonal.

There are not any special restrictions on a size of the honeycomb structure body 4, e.g., a length from the first end face 11 to the second end face 12 or a size of the cross section perpendicular to the extending direction of the cells 2 of the honeycomb structure body 4. Each size may suitably be selected so that the plugged honeycomb structure 100 of the present embodiment obtains the most suitable purifying performance when used as the exhaust gas purifying filter. For example, the length of the honeycomb structure body 4 from the first end face 11 to the second end face 12 is preferably from 80 to 300 mm, further preferably from 90 to 280 mm and especially preferably from 100 to 260 mm. Furthermore, an area of the cross section perpendicular to the extending direction of the cells 2 of the honeycomb structure body 4 is preferably from 7000 to 130000 mm$^2$, further preferably from 8500 to 120000 mm$^2$, and especially preferably from 11000 to 100000 mm$^2$.

In the plugged honeycomb structure 100 of the present embodiment, the plugging portions 5 are arranged in open ends of the predetermined cells 2 on the side of the first end face 11 and open ends of the residual cells 2 on the side of the second end face 12. Here, when the first end face 11 is defined as the inflow end face and the second end face 12 is defined as the outflow end face, the cells 2 which include the plugging portions 5 arranged in their open ends on the side of the outflow end face and are opened on the side of the inflow end face are defined as inflow cells. Furthermore, the cells 2 which include the plugging portions 5 arranged in their open ends on the inflow end face side and are opened on the outflow end face side are defined as outflow cells. It is preferable that the inflow cells and the outflow cells are alternately arranged via the partition walls 1. In consequence, it is preferable that a checkerboard pattern is formed by the plugging portions 5 and "the open ends of the cells 2" in each of the end faces of the plugged honeycomb structure 100.

It is preferable that the plugging portions 5 is made of a material which is considered to be preferable as a material of the partition walls 1. The material of the plugging portions 5 may be the same as or different from the material of the partition walls 1.

In the plugged honeycomb structure of the present embodiment, the catalyst may be loaded onto the partition walls forming the plurality of cells. The loading of the catalyst onto the partition walls means that the catalyst is coated on the surfaces of the partition walls and inner walls of the pores formed in the partition walls. According to this constitution, CO, NO$_x$, HC and the like in the exhaust gas can be converted into harmless substances by a catalytic reaction. Furthermore, it is possible to promote oxidation of PM such as trapped soot.

There are not any special restrictions on the catalyst for use in the plugged honeycomb structure of the present embodiment. It is preferable that the catalyst includes at least one selected from the group consisting of an SCR catalyst, a NO storage catalyst, and an oxidation catalyst. The SCR catalyst is a catalyst to selectively reduce components to be purified. It is especially preferable that the SCR catalyst is a $NO_x$ selective reducing SCR catalyst to selectively reduce NO in the exhaust gas. Furthermore, an example of the SCR catalyst is a metal-substituted zeolite. Examples of a metal in the metal-substituted zeolite include iron (Fe) and copper (Cu). A suitable example of zeolite is a beta zeolite. Furthermore, the SCR catalyst may be a catalyst containing, as a main component, at least one selected from the group consisting of vanadium and titania. Examples of the $NO_x$ storage catalyst include an alkali metal and an alkali earth metal. Examples of the alkali metal include potassium, sodium and lithium. An example of the alkali earth metal is calcium. An example of the oxidation catalyst is a catalyst containing a noble metal. Specifically, it is preferable that the oxidation catalyst contains at least one selected from the group consisting of platinum, palladium and rhodium.

An amount of the catalyst to be loaded per unit volume of the partition walls of the honeycomb structure body can suitably be determined in accordance with a type of catalyst for use. For example, when the oxidation catalyst is used as the catalyst, the amount of the catalyst to be loaded is preferably from 20 to 50 g/L and further preferably from 20 to 40 g/L. It is to be noted that the amount of the catalyst to be loaded is a mass (g) of the catalyst to be loaded per liter of the honeycomb structure body. An example of a method of loading the catalyst is a method of wash-coating a catalyst solution including a catalyst component on the partition walls, and performing a heat treatment at a high temperature to perform baking.

(2) Manufacturing Method of Plugged Honeycomb Structure:

There are not any special restrictions on a manufacturing method of the plugged honeycomb structure of the present embodiment shown in FIG. 1 to FIG. 3, and the plugged honeycomb structure can be manufactured, for example, by the following method. Initially, a plastic kneaded material to prepare the honeycomb structure body is prepared. The kneaded material to prepare the honeycomb structure body can be prepared by suitably adding an additive such as a binder, a pore former and water to a material selected as raw material powder from the above-mentioned suitable materials of the honeycomb structure body. As the raw material powder, for example, powder obtained by mixing silicon carbide powder and metal silicon powder is usable. Examples of the binder include methylcellulose, and hydroxypropyl methylcellulose. Furthermore, an example of the additive is a surfactant. A porosity and pore diameter distribution of the partition walls are adjustable by adjusting an amount of the pore former to be added.

Next, the kneaded material obtained in this manner is extruded to prepare a honeycomb formed body having partition walls defining a plurality of cells, and a circumferential wall disposed to surround the partition walls.

The obtained honeycomb formed body is dried, for example, by microwaves and hot air. Next, open ends of the cells are plugged with a material similar to the material used in preparing the honeycomb formed body to prepare plugging portions. The honeycomb formed body may further be dried after the plugging portions are prepared.

Next, the honeycomb formed body in which the plugging portions are prepared is fired, thereby manufacturing the plugged honeycomb structure. A firing temperature and firing atmosphere vary with raw materials, but a person skilled in the art can select the firing temperature and firing atmosphere which are most suitable for the selected material.

EXAMPLES

Example 1

Silicon carbide (SiC) powder and metal silicon (Si) powder were mixed at a mass ratio of 80:20 to prepare a mixed raw material as raw material powder to prepare a kneaded material. An average particle diameter of the silicon carbide powder was 30 μm. An average particle diameter of the metal silicon powder was 4 μm. Additionally, in the present example, the average particle diameter of each raw material powder was measured by laser diffractometry.

6 parts by mass of a binder, 15 parts by mass of a pore former and 24 parts by mass of water were added to 100 parts by mass of the mixed raw material, to prepare a forming raw material for the preparation of the kneaded material. Methylcellulose was used as the binder. Starch having an average particle diameter of 15 μm was used as the pore former. Next, the obtained forming raw material was kneaded by using a kneader, to obtain the kneaded material.

Next, the obtained kneaded material was formed by using an extruder, to prepare a honeycomb formed body. Then, the obtained honeycomb formed body was dried by high-frequency induction heating, and was further dried by using a hot air drier.

Next, plugging portions were formed in the dried honeycomb formed body. Initially, a mask was applied to an inflow end face of the honeycomb formed body. Then, a masked end portion (the end portion on the side of the inflow end face) was immersed in a plugging slurry, and the plugging slurry was charged into open ends of cells (outflow cells) which were not masked. In this way, the plugging portions were formed on the inflow end face side of the honeycomb formed body. Next, plugging portions were also similarly formed in inflow cells of an outflow end face of the dried honeycomb formed body.

Furthermore, the honeycomb formed body in which the plugging portions were formed was degreased and fired to manufacture a plugged honeycomb structure. The degreasing was performed at 550° C. for 3 hours, and the firing was performed at 1450° C. in an argon atmosphere for 2 hours.

The plugged honeycomb structure of Example 1 had an end face diameter of 143.8 mm, and a length of 152.4 mm in an extending direction of cells. Furthermore, a thickness of partition walls was 0.25 mm and a cell density was 46.5 cells/cm². Additionally, as to the cells defined by the partition walls, quadrangular cells and octagonal cells were alternately arranged in a cross section perpendicular to the cell extending direction. The inflow cells were the octagonal cells and the outflow cells were the quadrangular cells.

As to the plugged honeycomb structure of Example 1, a porosity of the partition walls, an average pore diameter and an accumulated pore volume were measured by the following methods. Table 1 shows the results. Furthermore, as to the accumulated pore volume, a total pore volume of pores formed in the partition walls was obtained on the basis of the measurement results, and there were further calculated respective ratios of a volume of pores having pore diameters of 10 μm or less, a volume of pores having pore diameters in a range of 18 to 36 μm, a volume of pores having pore diameters of 18 μm or more, a volume of pores having pore diameters in excess of 40 μm and a volume of pores having pore diameters of 40 μm or less to the total pore volume. Table 1 shows the results.

TABLE 1

| | Partition wall thickness [mm] | Porosity [%] | Average pore diameter [μm] | Total pore volume | Pore volume [cm³/g] 10 μm or less | 18-36 μm | 18 μm or more | Pore volume ratio [%] 10 μm or less | 18-36 μm | 18 μm or more | In excess of 40 μm | 40 μm or less |
|---|---|---|---|---|---|---|---|---|---|---|---|---|
| Comparative Example 1 | 0.25 | 49.0 | 19 | 0.317 | 0.027 | 0.140 | 0.180 | 9% | 44% | 57% | 12% | 88% |
| Comparative Example 2 | 0.25 | 49.3 | 18 | 0.321 | 0.030 | 0.110 | 0.140 | 9% | 34% | 44% | 11% | 89% |
| Comparative Example 3 | 0.25 | 48.5 | 18 | 0.311 | 0.034 | 0.089 | 0.118 | 11% | 29% | 38% | 10% | 90% |
| Comparative Example 4 | 0.25 | 49.4 | 16 | 0.322 | 0.039 | 0.071 | 0.105 | 12% | 22% | 33% | 10% | 90% |
| Comparative Example 5 | 0.25 | 49.6 | 16 | 0.325 | 0.039 | 0.052 | 0.085 | 12% | 16% | 26% | 10% | 90% |
| Comparative Example 6 | 0.25 | 49.2 | 14 | 0.319 | 0.040 | 0.037 | 0.066 | 13% | 12% | 21% | 10% | 90% |
| Example 1 | 0.25 | 47.1 | 13 | 0.294 | 0.038 | 0.018 | 0.041 | 13% | 6% | 14% | 8% | 92% |
| Example 2 | 0.25 | 49.1 | 14 | 0.318 | 0.037 | 0.033 | 0.065 | 12% | 10% | 20% | 9% | 91% |
| Example 3 | 0.25 | 48.3 | 13 | 0.308 | 0.036 | 0.028 | 0.060 | 12% | 9% | 19% | 9% | 91% |
| Example 4 | 0.25 | 47.4 | 13 | 0.297 | 0.036 | 0.021 | 0.053 | 12% | 7% | 18% | 9% | 91% |
| Example 5 | 0.25 | 46.5 | 12 | 0.287 | 0.060 | 0.016 | 0.045 | 21% | 6% | 16% | 8% | 92% |
| Example 6 | 0.25 | 43.4 | 11 | 0.253 | 0.080 | 0.013 | 0.041 | 32% | 5% | 16% | 9% | 91% |
| Example 7 | 0.25 | 42.0 | 11 | 0.239 | 0.099 | 0.010 | 0.040 | 41% | 4% | 17% | 9% | 91% |
| Example 8 | 0.25 | 52.0 | 14 | 0.357 | 0.050 | 0.033 | 0.065 | 14% | 9% | 18% | 7% | 93% |
| Example 9 | 0.25 | 51.4 | 16 | 0.348 | 0.047 | 0.032 | 0.063 | 14% | 9% | 18% | 9% | 91% |
| Example 10 | 0.15 | 47.0 | 14 | 0.292 | 0.039 | 0.026 | 0.056 | 13% | 9% | 19% | 9% | 91% |
| Example 11 | 0.36 | 46.8 | 14 | 0.290 | 0.035 | 0.023 | 0.058 | 12% | 8% | 20% | 8% | 92% |
| Comparative Example 7 | 0.25 | 41.7 | 11 | 0.236 | 0.121 | 0.009 | 0.029 | 51% | 4% | 12% | 8% | 92% |
| Comparative Example 8 | 0.25 | 40.9 | 10 | 0.228 | 0.125 | 0.008 | 0.033 | 55% | 4% | 14% | 9% | 91% |
| Comparative Example 9 | 0.25 | 40.1 | 9 | 0.221 | 0.131 | 0.008 | 0.031 | 59% | 4% | 14% | 9% | 91% |
| Comparative Example 10 | 0.37 | 47.1 | 13 | 0.293 | 0.038 | 0.026 | 0.059 | 13% | 9% | 20% | 9% | 91% |
| Comparative Example 11 | 0.14 | 46.2 | 13 | 0.283 | 0.042 | 0.028 | 0.058 | 15% | 10% | 20% | 8% | 92% |

(Porosity)

The porosity of the partition walls was measured by using AutoPore 9500 (tradename) manufactured by Micromeritics Instrument Corp. In the measurement of the porosity, a part of the partition walls was cut out as a test piece from the plugged honeycomb structure, and the porosity was measured by using the obtained test piece. The test piece was a rectangular parallelepiped having a vertical length of about 10 mm, a horizontal length of about 10 mm, and a height of about 20 mm. A sample region of the test piece was the vicinity of a center of a honeycomb structure body in an axial direction.

(Average Pore Diameter)

The average pore diameter of the partition walls was measured by using AutoPore 9500 (tradename) manufactured by Micromeritics Instrument Corp. The measurement of the average pore diameter was also performed by using the test piece used in the measurement of the porosity. Additionally, the average pore diameter of the partition walls was defined and calculated as a pore diameter to provide a volume of a half of the total pore volume by mercury porosimetry.

(Accumulated Pore Volume)

The accumulated pore volume of the partition walls was measured by using AutoPore 9500 (tradename) manufactured by Micromeritics Instrument Corp. The measurement of the accumulated pore volume was also performed by using the test piece used in the measurement of the porosity.

Furthermore, a graph showing a pore diameter distribution of the plugged honeycomb structure was prepared as shown in FIG. 4 on the basis of the measurement result of the accumulated pore volume. In the prepared graph, the abscissa indicated the pore diameter and the ordinate indicated a log differential pore volume. A pore diameter indicating a maximum value of the log differential pore volume was obtained from the prepared graph. Table 2 shows "the pore diameter indicating the maximum value of the log differential pore volume" in a column of a "peak pore diameter". Furthermore, a half-value width of a peak including the maximum value of the log differential pore volume was obtained from the prepared graph. Table 2 shows "the half-value width of the peak including the maximum value of the log differential pore volume" in a column of the "half-value width".

TABLE 2

| | Peak pore diameter [μm] | Half-value width [μm] | Trapping performance | Pressure loss | General evaluation |
|---|---|---|---|---|---|
| Comparative Example 1 | 18.1 | 8.2 | C | A | Failure |
| Comparative Example 2 | 17.3 | 7.9 | C | A | Failure |
| Comparative Example 3 | 16.7 | 7.5 | C | A | Failure |
| Comparative Example 4 | 15.5 | 7.3 | C | A | Failure |
| Comparative Example 5 | 14.3 | 6.3 | C | A | Failure |

TABLE 2-continued

|  | Peak pore diameter [μm] | Half-value width [μm] | Trapping performance | Pressure loss | General evaluation |
|---|---|---|---|---|---|
| Comparative Example 6 | 13.9 | 5.8 | C | A | Failure |
| Example 1 | 12.4 | 1.3 | A | A | Excellent |
| Example 2 | 13.7 | 5.0 | A | A | Excellent |
| Example 3 | 12.9 | 4.0 | A | A | Excellent |
| Example 4 | 12.6 | 2.8 | A | A | Excellent |
| Example 5 | 11.2 | 1.4 | A | A | Excellent |
| Example 6 | 10.5 | 1.7 | A | B | Good |
| Example 7 | 10 | 1.9 | A | B | Good |
| Example 8 | 13.7 | 4.7 | A | A | Excellent |
| Example 9 | 15.9 | 4.8 | A | A | Excellent |
| Example 10 | 12.8 | 4.8 | A | A | Excellent |
| Example 11 | 13.2 | 3.8 | A | B | Good |
| Comparative Example 7 | 9.7 | 2.1 | A | C | Failure |
| Comparative Example 8 | 9.5 | 1.8 | A | C | Failure |
| Comparative Example 9 | 8.7 | 1.9 | A | D | Failure |
| Comparative Example 10 | 12.3 | 2.3 | A | C | Failure |
| Comparative Example 11 | 12.9 | 1.8 | C | B | Failure |

As to the plugged honeycomb structure of Example 1, a trapping efficiency and pressure loss were evaluated by the following methods. Furthermore, on the evaluation result, general evaluation was performed in accordance with the following evaluation criteria. Table 2 shows the results.

(Trapping Efficiency)

In the evaluation of the trapping efficiency, the number of leaked particulates of particulate matter (hereinafter abbreviated to "PM") in the case of using the plugged honeycomb structure as an exhaust gas purifying filter was measured, and the trapping efficiency was evaluated on the basis of the result. Specifically, the plugged honeycomb structure was initially attached to an exhaust system of a car in which a diesel engine having a displacement of 2.0 liters was mounted. When this car was run in a new European driving cycle (NEDC) mode, a PM trapping efficiency was calculated from a ratio of the accumulated number of particulates of the PM in an outlet (an outflow side) of the plugged honeycomb structure to the total number of particulates of the PM in an exhaust gas. The measurement of the number of the particulates of the PM was performed in accordance with a method suggested by a particulate measurement program (abbreviated to "PMP") in the exhaust gas energy experts meeting of the world forum for harmonization of vehicle regulations in Economic Commission for Europe. When the trapping efficiency obtained in this manner was 90% or more, evaluation result was A, and when the trapping efficiency was smaller than 90%, evaluation result was C.

(Pressure Loss)

Soot was trapped by the partition walls of the plugged honeycomb structure by causing the exhaust gas emitted from the diesel engine to flow into the plugged honeycomb structure. The diesel engine was an in-line six-engine having a displacement of 3.0 liters and including a direct injection common rail. The soot was trapped so that an amount of the soot to be deposited per unit volume of the honeycomb structure body of the plugged honeycomb structure was 4 g/L. Then, when the exhaust gas at 200° C. from the engine flowed into the plugged honeycomb structure at a flow rate of 3.0 Nm³/min in a state where the amount of the deposited soot was 4 g/L, pressures on the inflow end face side and the outflow end face side of the plugged honeycomb structure were measured. Next, a differential pressure between the pressure on the inflow end face side and the pressure on the outflow end face side was calculated, to obtain pressure loss (kPa) of the plugged honeycomb structure. Additionally, the measurement of the pressure loss was performed twice in a state prior to loading a catalyst onto the plugged honeycomb structure and a state where the catalyst was loaded. Then, evaluations A to D were judged in accordance with the following judgment criteria on the basis of an increase ratio of the pressure loss before and after the catalyst was loaded.

Evaluation A: When the increase ratio from the pressure loss prior to loading the catalyst was 20% or less, evaluation result was A.

Evaluation B: When the increase ratio from the pressure loss prior to loading the catalyst was in excess of 20% and 40% or less, evaluation result was B.

Evaluation C: When the increase ratio from the pressure loss prior to loading the catalyst was in excess of 40% and 60% or less, evaluation result was C.

Evaluation D: When the increase ratio from the pressure loss prior to loading the catalyst was in excess of 60%, evaluation result was D.

Additionally, in the above-mentioned evaluation of the pressure loss, the catalyst was loaded by the following method. Initially, there were prepared a $\gamma$-$Al_2O_3$ catalyst onto which platinum (Pt) was loaded, and $CeO_2$ powder. The $CeO_2$ powder was an auxiliary catalyst. An $Al_2O_3$ sol and water were added to a mixture of the $\gamma$-$Al_2O_3$ catalyst and the $CeO_2$ powder, to prepare a catalyst slurry. Next, the prepared catalyst slurry was wash-coated on the plugged honeycomb structure so that an amount of a platinum component to be loaded per unit volume was 1 g/L and an amount of all catalyst components to be loaded per unit volume was 20 g/L. In the loading of the catalyst, the plugged honeycomb structure was dipped to blow off an excessive catalyst slurry, and was immersed into the slurry. Then, the plugged honeycomb structure was dried at 120° C., and further heat-treated at 500° C. for 3 hours, thereby obtaining the plugged honeycomb structure onto which the catalyst was loaded.

(General Evaluation)

When the evaluation result of the trapping efficiency and the evaluation result of the pressure loss were both "A", general evaluation result was "excellent". When the evaluation result of the trapping efficiency was "A" and the evaluation result of the pressure loss was "B", the general evaluation result was "good". When the evaluation result of the trapping efficiency was "C" or the evaluation result of the pressure loss was "C" or "D", the general evaluation result was "failure".

Examples 2 to 11

The procedure of Example 1 was repeated except that a thickness of partition walls, a porosity, an average pore diameter, a total pore volume and a pore volume ratio were changed as shown in Table 1, to prepare plugged honeycomb structures. The porosity, the average pore diameter and the like were adjusted by adjusting particle diameters and an amount of a pore former to be added to a forming raw material. For example, in Example 2, the forming raw material was prepared on the same conditions as in Example 1, except that the average particle diameter of the pore former was 15 μm and the amount of the pore former to be added was 20 parts by mass. Furthermore, as to Example 3 and others, the forming raw material was prepared by adjusting the amount of the pore former to be added (corresponding to "the amount of the pore former (mass %)" in Table 3) as shown in Table 2.

TABLE 3

|  | Total pore volume [cm³/g] | Amount of pore former [mass %] |
|---|---|---|
| Example 1 | 0.294 | 15 |
| Example 2 | 0.318 | 20 |
| Example 3 | 0.308 | 18 |
| Example 4 | 0.297 | 16 |
| Example 5 | 0.287 | 14 |
| Example 6 | 0.253 | 7 |
| Example 7 | 0.239 | 4 |
| Example 8 | 0.357 | 30 |
| Example 9 | 0.348 | 27 |
| Example 10 | 0.292 | 14 |
| Example 11 | 0.290 | 13 |

Comparative Examples 1 to 11

The procedure of Example 1 was repeated except that a thickness of partition walls, a porosity, an average pore diameter, a total pore volume and a pore volume ratio were changed as shown in Table 1, to prepare plugged honeycomb structures. The porosity, the average pore diameter and the like were adjusted by adjusting particle diameters and an amount of a pore former to be added to a forming raw material. As to Comparative Examples 1, 4, 6 and 7, Table 4 shows an average particle diameter (μm) and a mass ratio (mass %) of silicon carbide (SiC) powder and an average particle diameter (μm) and a mass ratio (mass %) of metal silicon (Si) powder, in columns of an "average particle diameter (μm)" and an "amount (mass %)".

TABLE 4

|  | SiC | | Si | |
|---|---|---|---|---|
|  | Average particle diameter [μm] | Amount [mass %] | Average particle diameter [μm] | Amount [mass %] |
| Comparative Example 1 | 33 | 80 | 4 | 20 |
| Comparative Example 4 | 30 | 80 | 4 | 20 |
| Comparative Example 6 | 30 | 80 | 4 | 20 |
| Comparative Example 7 | 30 | 80 | 4 | 20 |

(Result)

In each of the plugged honeycomb structures of Examples 1 to 11, the evaluation result of the trapping efficiency and the evaluation result of the pressure loss were both excellent, and the result of "excellent" or "good" was obtainable in the general evaluation. On the other hand, in each of the plugged honeycomb structures of Comparative Examples 1 to 6, the evaluation result of the trapping efficiency was "C", and the trapping efficiency was remarkably bad. Furthermore, in each of the plugged honeycomb structures of Comparative Examples 7 to 10, the evaluation result of the pressure loss was "C" or "D", and an increase ratio of the pressure loss was remarkably high. Furthermore, in the plugged honeycomb structure of Comparative Example 11, the evaluation result of the pressure loss was "B" and the result of the general evaluation was "good", but the evaluation result of the trapping efficiency was "C", and the trapping efficiency was remarkably bad.

A plugged honeycomb structure of the present invention is utilizable as a trapping filter to remove particulates and the like included in an exhaust gas.

DESCRIPTION OF REFERENCE NUMERALS

1: partition wall, 2: cell, 3: circumferential wall, 4: honeycomb structure body, 5: plugging portion, 11: first end face, 12: second end face, and 100: plugged honeycomb structure.

What is claimed is:

1. A plugged honeycomb structure comprising:
  a pillar-shaped honeycomb structure body having porous partition walls arranged to surround a plurality of cells extending from a first end face to a second end face and forming through channels for a fluid; and
  plugging portions each of which is disposed in an open end of each of the plurality of cells on the side of the first end face or the second end face,
  wherein the partition walls are made of a material including silicon carbide,
  a porosity of the partition walls which is measured by mercury porosimetry is from 42 to 52%,
  a thickness of the partition walls is from 0.15 to 0.36 mm, and
  in an accumulated pore volume of the partition walls which is measured by the mercury porosimetry, a ratio of a volume of pores having pore diameters of 10 μm or less to a total pore volume of the partition walls is 41% or less, and a ratio of a volume of pores having pore diameters in a range of 18 to 36 μm to the total pore volume is 10% or less, and
  in a pore diameter distribution of the partition walls in which the abscissa indicates the pore diameter and the ordinate indicates a log differential pore volume, the pore diameter indicating a maximum value of the log differential pore volume is in a range of 10 to 16 μm, and a half-value width of a peak including the maximum value of the log differential pore volume is 5 μm or less.

2. The plugged honeycomb structure according to claim 1, wherein a ratio of a volume of pores having pore diameters of 18 μm or more to the total pore volume of the partition walls is 20% or less.

3. The plugged honeycomb structure according to claim 2, wherein a ratio of a volume of pores having pore diameters of 40 μm or less to the total pore volume of the partition walls is 91% or more.

4. The plugged honeycomb structure according to claim 3, wherein the material constituting the partition walls includes 40 mass % or more of silicon carbide.

5. The plugged honeycomb structure according to claim 4, wherein the volume of the pores having pore diameters of 10 μm or less in the partition walls is 0.1 cm³/g or less.

6. The plugged honeycomb structure according to claim 5, wherein a volume of pores having pore diameters of 18 μm or more in the partition walls is 0.065 cm³/g or less.

7. The plugged honeycomb structure according to claim 6, wherein the volume of the pores having the pore diameters in the range of 18 to 36 μm in the partition walls is 0.035 cm³/g or less.

8. The plugged honeycomb structure according to claim 1, wherein a ratio of a volume of pores having pore diameters of 40 μm or less to the total pore volume of the partition walls is 91% or more.

9. The plugged honeycomb structure according to claim 1, wherein the material constituting the partition walls includes 40 mass % or more of silicon carbide.

10. The plugged honeycomb structure according to claim 1, wherein the volume of the pores having pore diameters of 10 μm or less in the partition walls is 0.1 cm$^3$/g or less.

11. The plugged honeycomb structure according to claim 1, wherein a volume of pores having pore diameters of 18 μm or more in the partition walls is 0.065 cm$^3$/g or less.

12. The plugged honeycomb structure according to claim 1, wherein the volume of the pores having the pore diameters in the range of 18 to 36 μm in the partition walls is 0.035 cm$^3$/g or less.

* * * * *